United States Patent [19]
Mongia et al.

[11] Patent Number: 6,141,953
[45] Date of Patent: Nov. 7, 2000

[54] MULTI-SHAFT REHEAT TURBINE MECHANISM FOR GENERATING POWER

[75] Inventors: Rajiv K. Mongia, Berkeley; Steven G. Buckley, San Mateo; George L. Touchton, Newark; Robert W. Dibble, Livermore; Peter D. Neuhaus, Berkeley, all of Calif.

[73] Assignee: Solo Energy Corporation, Alameda, Calif.

[21] Appl. No.: 09/034,101

[22] Filed: Mar. 4, 1998

[51] Int. Cl.⁷ .............................. F02C 1/06; F02G 1/055
[52] U.S. Cl. ................... 60/39.04; 60/39.17; 60/39.512
[58] Field of Search ................... 60/39.04, 39.161, 60/39.17, 39.511, 39.512, 723

[56] References Cited

U.S. PATENT DOCUMENTS

| | | | |
|---|---|---|---|
| 2,621,475 | 12/1952 | Loy | 60/39.17 |
| 2,624,172 | 1/1953 | Houdry | 60/39.17 |
| 3,747,944 | 7/1973 | Roy et al. | 60/39.511 |
| 3,975,900 | 8/1976 | Pfefferle | 60/39.03 |
| 5,347,806 | 9/1994 | Nakhamkin | |
| 5,386,688 | 2/1995 | Nakhamkin | |

*Primary Examiner*—Charles G. Freay
*Attorney, Agent, or Firm*—Burns, Doane, Swecker & Mathis, L.L.P.

[57] ABSTRACT

A multi-shaft reheat turbine mechanism includes multiple turbines mounted on respective compressor shafts, and catalytic reactors feeding respective ones of the turbines. Fuel is introduced into a low pressure compressor, whereby there is no need to pressurize the fuel. The compressor side of the mechanism emits a compressed air/fuel flow, portions of which are combusted in respective ones of the catalytic reactors. The air/fuel flow traveling from the compressor side to the turbine side passes through a regenerator in heat exchanging relationship with exhaust gas from a low pressure turbine.

18 Claims, 3 Drawing Sheets

MULTI-SHAFT REHEAT TURBINE MECHANISM FOR GENERATING POWER

BACKGROUND OF THE INVENTION

The present invention relates to a multi-shaft reheat turbine mechanism for generating power.

There is disclosed in U.S. Pat. Nos. 5,347,806 and 5,386,688 (the disclosures of which being incorporated herein by reference) a multi-shaft reheat turbine mechanism for generating power. One form of that mechanism is depicted schematically in FIG. 4. The power shaft assembly represents a conventional heavy duty combustion turbine or an aircraft derivative combustion turbine which includes a lower pressure compressor 10, an expansion turbine 30, a combustor 20 which feeds heated combustion product gas to the expansion turbine 30, the expansion turbine 30 being coupled to drive the compressor 10, and an electric generator 60A. Two additional shaft assemblies are provided. Also, a heat exchanger in the form of a recuperator 50 is provided which may be a chemical recuperator.

The first additional shaft assembly includes an intercooler 40, an intermediate pressure compressor 110, an intermediate pressure combustor 120 and an intermediate pressure expansion turbine 130. The second additional shaft assembly includes a high pressure intercooler 140, a high pressure compressor 210, a high pressure combustor 220 and a high pressure expansion turbine 230. The intercoolers 40 and 140 are cooled by water supplied from a cooling tower or other water sources (lakes, rivers, etc.)

As shown, the air and gas path extends through the modified compressor of the conventional power shaft assembly, through the intercoolers and compressors of the additional shaft assemblies, through the recuperator, through the combustors and expansion turbines of the additional shaft assemblies, and then through the combustor and expansion turbine of the conventional power shaft assembly. Thus, the exhaust 2 of the lower pressure compressor 10 passes through the intercooler 40 which reduces its temperature at the inlet 11 of the intermediate compressor 110. The pressure of the air is then again raised and provided from the exhaust 12 of the compressor 110 to the intercooler 140 which lowers its temperature and delivers the cooled intermediate pressure air to the inlet 21 of the high pressure compressor 210. The exhaust 22 of the high pressure compressor 210 is provided as an input to the heat recuperator 50. The outlet 5 of the heat recuperator 50 to which fuel has been added, is connected to the high pressure combustor 220, whose outlet 23 is connected to the high pressure expansion turbine 230. The exhaust 24 of the high pressure expansion turbine 230 receives fuel and is heated in the intermediate pressure combustor 120 and then is delivered to the inlet 13 of the intermediate pressure expansion turbine 130. The exhaust 14 of the intermediate pressure expansion turbine 130 receives fuel and is heated in the low pressure combustor 20 and then provided to the inlet 3 of the low pressure expansion turbine 30, the exhaust 4 of which is utilized as a heat source of the heat recuperator 50, before going to the system exhaust 6.

The compression ratio of the compressor 10 is substantially reduced from what it would have been in the absence of the additional shaft assemblies. Accordingly, the turbine 30 can supply more of its power for driving generator 60A. This lowering of the compression pressure ratio of the compressor 10 is accompanied by raising the overall compression pressure ratio of the additional shaft assemblies over the overall expansion pressure ratio of the additional shaft assemblies expansion turbines. By introducing the intercoolers 40 and 140, the temperature of the air entering the compressors 110 and 210 is reduced, which reduces the power consumed by the compressor 110 and 210, and for the same power consumption by the compressors allows for increased compression pressure ratios.

Such a system, also known as a cascaded advanced turbine (CAT) cycle, has achieved improvements in efficiency, compared to a standard recuperated cycle.

Notwithstanding the advantages attained by the above-described system, certain shortcomings exist. For instance, fuel must be added to each of the combustors 220, 120, 20 i.e., at locations that are at high pressure, whereby energy must be expended to elevate the pressure of the incoming fuel. This would be done using a pump for liquid fuels or a compressor for gaseous fuels. Compressors for pre-pressurizing the fuel require substantial energy that reduces the overall efficiency, rendering the system impractical in small capacity generating systems as used, for example, in small commercial or light industrial settings.

Moreover, compressors and pumps represent potential sources of malfunction, thereby diminishing the overall reliability of the system.

SUMMARY OF THE INVENTION

The present invention relates to a multi-shaft reheat turbine assembly intended to overcome or alleviate those short-comings. The assembly comprises a plurality of shafts, expansion turbines connected to all shafts and compressor connected to at least two shafts for compressing air and fuel, and an expansion turbine connected to the shaft. An inter-cooler is disposed in a line extending between an outlet of one of the compressors and an inlet of another of the compressors for cooling a compressed air/fuel flow traveling between those compressor. The compressors constitute a compressor side of the mechanism for compressing air/fuel, and the turbines constitutes a turbine side of the mechanism for driving the compressors. An electrical generator is operably connected to one of the turbines to be powered thereby. A heat exchanger is provided for conducting compressed air/fuel from the compressor side in heat exchange relationship with hot exhaust gas from the turbine side, to heat the compressed air/fuel. The turbine side further includes combustors for combusting compressed air/fuel. Each combustor is disposed upstream of an associated turbine and includes an outlet for conducting combusted air/fuel to its respective turbine. The first of the turbines is disposed upstream of a second of the turbines, with an exhaust outlet of the first turbine connected to a second combustor associated with the second turbine. A conduit arrangement is provided for conducting a first portion of the heated compressed air/fuel to a first of the combustors, and for conducting the exhaust gas from the first combustor together with a second portion of the heated compressed air/fuel to the first turbine.

Preferably, the heat exchanger is a regenerator, and each of the first and second combustors is a catalytic reactor.

The present invention also relates to a method of producing energy, utilizing a multi-shaft reheat turbine mechanism comprising a plurality of shafts, expansion turbines connected to all shafts, and compressors connected to at least two shafts. The compressors constitute a compressor side, and the turbines constitute a turbine side. The method comprises the steps of:

A. delivering air and fuel to a compressor which emits compressed air/fuel;

B. cooling the compressed air/fuel in an intercooler;

C. delivering the cooled air/fuel from the intercooler to another compressor;

D. passing cooled air/fuel through a heat exchanger in heat exchanging relationship with exhaust gas from the turbine side of the mechanism, subsequent to step C;

E. combusting a first portion of the heated compressed air/fuel in a first combustor and delivering the products of combustion therefrom, together with a second portion of the heated compressed air/fuel to a first turbine;

F. conducting a first portion of expanded exhaust from the first turbine to a second combustor, and delivering a second portion of the expanded exhaust from the first turbine to a second turbine disposed downstream of the second combustor; and G. driving an electrical generator operably connected to the turbine side.

BRIEF DESCRIPTION OF THE DRAWING

The objects and advantages of the invention will become apparent from the following detailed description of preferred embodiments thereof in connection with the accompanying drawing in which like numerals designate like elements and in which.

DETAILED DESCRIPTION OF A PREFERRED PREFERRED EMBODIMENT OF THE INVENTION

Figure 1:
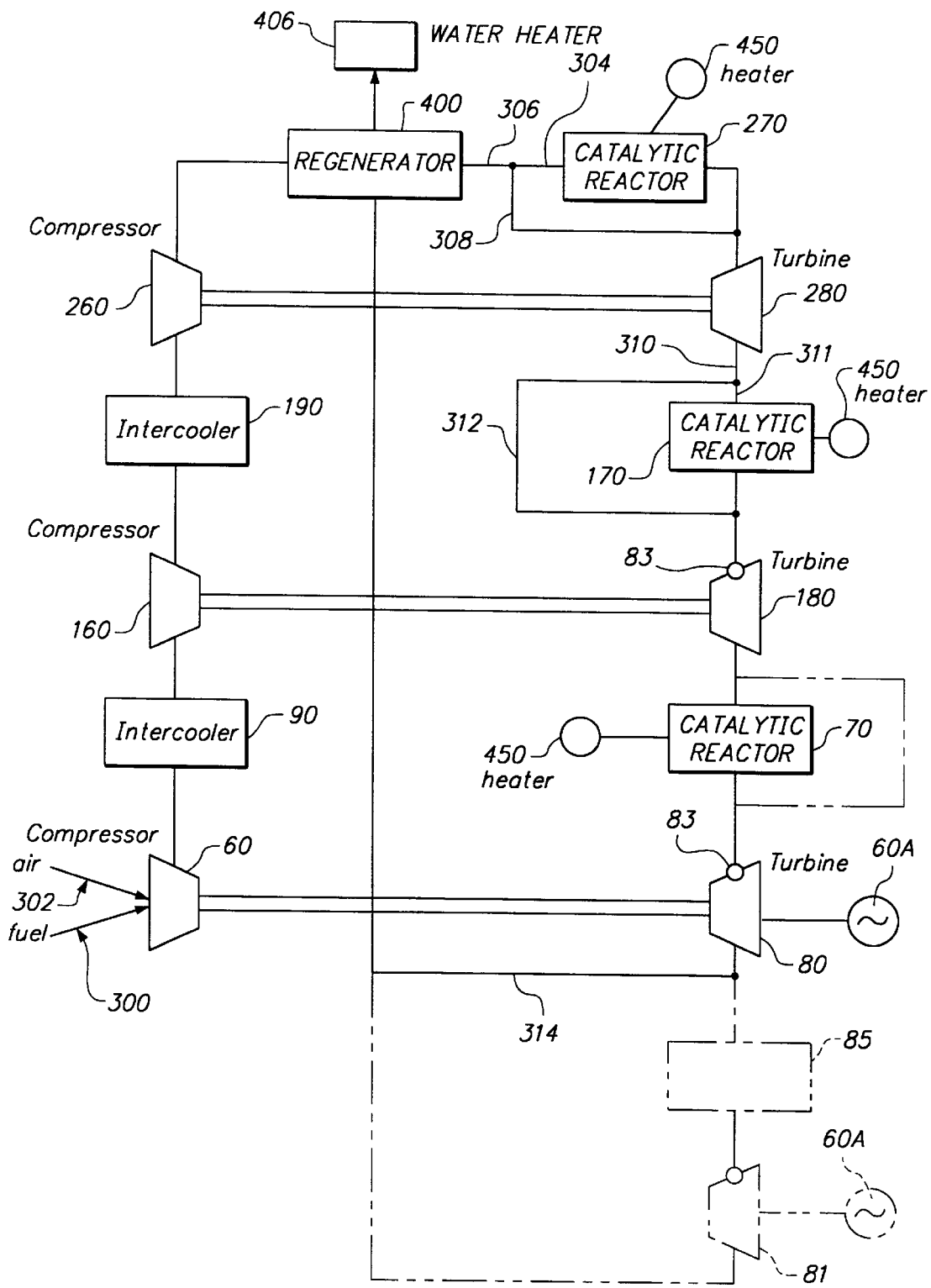
FIG. 1 is a schematic view of a multi-shaft reheat turbine mechanism according to the present invention.

An embodiment of the invention depicted in FIG. 1 relates to a CAT (Cascaded Advance Turbine) cycle which includes a low pressure (first) compressor 60, an intermediate pressure (second) compressor 160, a high pressure (third) compressor 260, a high pressure (first) turbine 280, an intermediate (second) pressure turbine 180, and a low pressure (third) turbine 80. The turbines are preceded by respective first, second, and third combustors 70, 170, 270, preferably in the form of catalytic combustors (reactors). The compressors constitute a compressor side of the system, and the turbines constitute a turbine side of the system. Fuel/air that is compressed on the compressor side is conducted through a heat exchanger 400 before reaching the turbine side. The turbine side drives an electrical generator 60A which can be connected to any of the turbines.

All of the fuel is introduced into the low pressure compressor 60 via line 300, and air is introduced separately via line 302. Thus, entry of the air and fuel into the low pressure compressor 60 is produced by an aspirating action, so the fuel need not be pressurized. In fact, fuel such as natural gas can be supplied at low pressure from a conventional home line pressure natural of about 6 inches of gauge water pressure. Air/fuel which is compressed on the compressor side is heated in the heat exchanger 400 before being delivered to the turbine side. According to the invention, steps are taken to combust some of the heated compressed air/fuel in each of the combustors 70, 170, 270 to provide a reheating step after the expansion turbines 180 and 280, respectively.

Since the portions of the heated compressed air/fuel stream that by-pass the first combustor 270 are introduced into the turbines 280 and 180, rather than being introduced directly into the combustors 170 and 70, the energy of those by-pass portions of the stream can be captured by being expanded within the turbines prior to being combusted.

One way of providing uncombusted fuel to each of the catalytic reactors is to specifically design the sizes of the air/fuel conduits on the turbine side of the system. For instance, the conduit 304 which feeds the high pressure catalytic reactor 270 is of smaller diameter than the conduit 306 which extends from the heat exchanger 400, thereby causing some of the air/fuel flow from conduit 306 to travel to the conduit 308. The conduit 308 discharges the air/fuel at a location between the first catalytic combustor 270 and the turbine 280.

A conduit 312 includes an inlet located downstream of the first turbine 280 at an intersection of conduits 310, 311. The conduit 311 is of smaller diameter than the conduit 310, causing some of the compressed air/fuel from conduit 310 to enter the conduit 312. The conduit 312 discharges that compressed air/fuel at a location between the second catalytic combustor 170 and the second turbine 180.

Alternatively, the same result could be achieved by positioning an adjustable valve at the intersection of conduits 306, 304 and 308, and another adjustable valve at the intersection of conduits 310, 311, 312. The valves would distribute the air/fuel flow at desired ratios.

Another method would be to flow all of the air/fuel in series through the catalytic reactors (i.e., no by-passing occurs), while ensuring that less than all of the fuel is consumed in the first two reactors 220,120. For example, the residence time of the air/fuel in the first two reactors could be controlled, e.g., by designing the reactors with a particular length, or making part of the catalyst inactive, whereby only some of the fuel is consumed in the high pressure reactor 270, some of the remaining non-consumed fuel is consumed in the intermediate pressure reactor 170, and the rest of the fuel is consumed in the lower pressure reactor 70.

Accordingly, the efficiency advantages of a CAT cycle are achieved without the need for separately pressurizing the fuel using a fuel compressor, thereby further increasing the efficiency, safety, and reliability of the system.

The use of catalytic reactors in lieu of conventional burners offers particular advantages. For instance, due to the high air/fuel ratios used in catalytic reactors, the air/fuel mixtures entering the catalytic reactors need never be explosive or flammable. An air/fuel mixture of a hydrocarbon fuel in a 120:1 ratio will typically react in a catalytic combustion reactor, while for a fuel such as natural gas, an air/fuel ratio of roughly 25 or less is needed for a flame under typical conditions. Also, lower fuel levels of pollutants, i.e., CO, hydrocarbons, and $NO_x$, are produced by catalytic reactors compared with conventional burners.

The products of combustion exhausted from the turbine side, e.g., from the low pressure turbine 80, are conducted via conduit 314 through the heat exchanger 400. Alternatively, as shown in phantom lines in FIG. 1, the exhaust gas from the turbine side may come from a separate power turbine 81 disposed downstream of the lower pressure turbine 80. In that event, a catalytic combustor 85 could be provided upstream of the power turbine 81, and a by-pass conduit 87 could be provided to divert uncombusted fuel to the inlet of the turbine 80.

Figure 3:
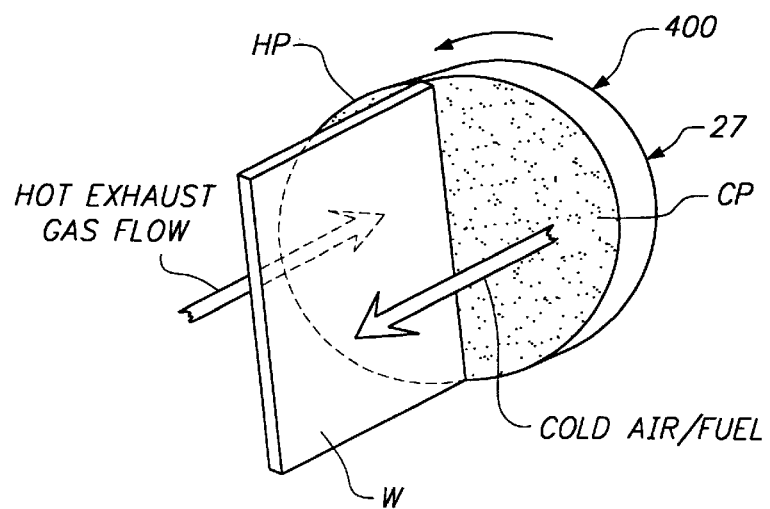
FIG. 3 is a schematic perspective view of a regenerator type of heat exchanger used in the present invention.
Figure 4:
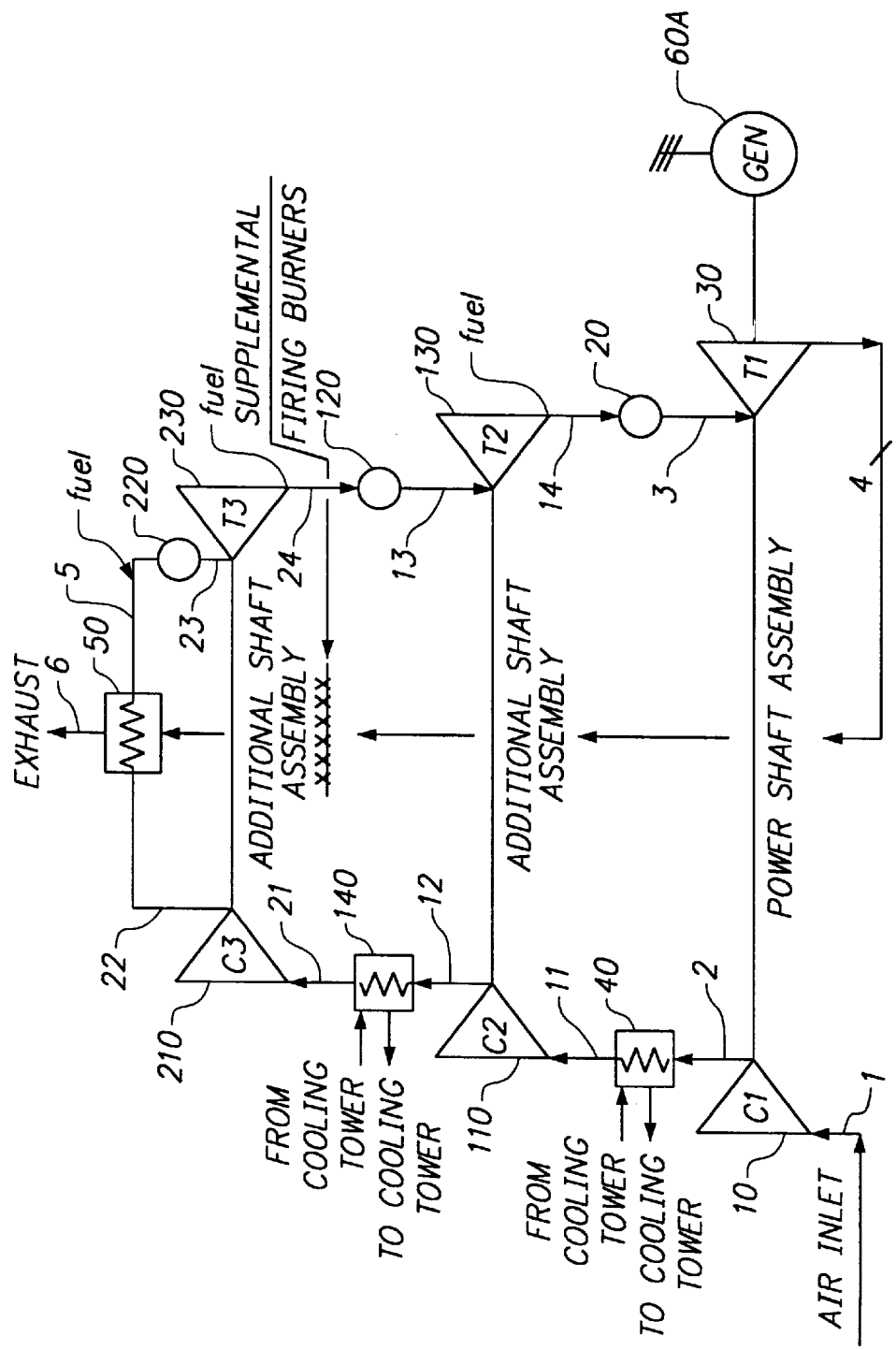
FIG. 4 is a schematic view of a conventional multi-shaft reheat turbine mechanism.

The heat exchanger 400 is preferably in the form of a regenerator. In a regenerator type of heat exchanger, depicted schematically in FIG. 3, a housing including a stationary partition wall W forms a cold flow path CP and a separate hot flow path HP. A core C formed of a porous heat transmitting material is moved (in the case of FIG. 3, it is rotated) sequentially through the hot and cold air paths HP, CP. The cold path conducts the cold air/fuel mixture from the high pressure compressor 260, and the hot path conducts the hot exhaust flow from the turbine side. The core C becomes heated as it passes through the hot path and then gives up heat to the air/fuel mixture in the cold path. A highly suitable regenerator is disclosed in concurrently filed U.S. application Ser. No. 09/034,394 now U.S. Pat. No. 6,085,829, the disclosure of which is incorporated herein by reference.

A regenerator type of heat exchanger has a higher heat exchange effectiveness than a recuperator type of heat exchanger such as disclosed in U.S. Pat. Nos. 5,347,806 and 5,386,688 and thus can be made much smaller than a recuperator to achieve a comparable heat transfer flow. Also, the rate of heat transfer of a regenerator can be easily regulated by adjusting the rotary speed of the core, which is useful in varying the heat/electric ratio of a cogeneration machine, and which also translates into a faster response time for turn-up and turndown of the machine in response to load changes.

After passing through the regenerator 400, the hot exhaust gas is delivered to one or more devices 406 which utilize heat, such as a hot water heater for example.

During start-up of the system, the catalytic reactors are preheated by electric heaters 450 (or other types of heaters) to a temperature suitable for catalyst activation. Once the start-up phase has ended, i.e., once the catalytic reactors have become hot enough to support combustion, the shafts of one or more of the spools are rotated by starter motors (not shown) to draw-in air and fuel which is compressed in the compressor side of the mechanism, and then is combusted and expanded in the turbine side.

In order to facilitate start-up of the system, the inlets of some or each of the turbines 81, 80, 180 could be provided with waste gates 83 which enable some or all of the pressurized gas being conducted toward the turbine to be vented to atmosphere before entering the turbine. That serves to minimize the occurrence of pressure build-up in the upstream turbine (starter turbine) 280 and makes that turbine 280 easier to operate. The waste gates can be progressively closed as the upstream turbines speed up.

It will be appreciated that by injecting air and fuel directly into the lower pressure compressor 60, there is no need to pressurize the fuel, and there is no need for a separate air/fuel mixer, thereby simplifying the system and reducing its cost. A separate mixer would generate a pressure drop and thus produce an energy loss. The air is preferably introduced via the normal compressor air inlet, and fuel is preferably introduced via a separate opening in the compressor wall.

Since the above-described system can be operated using standard line pressure natural gas normally delivered to residences or small commercial establishments, and since only a small heat exchanger, i.e a regenerator, needs to be used, the above-described energy generating system is ideal for use in small power generating systems.

Since catalytic reactors are employed, the above-described system is much cleaner and safer than similar systems employing conventional combustors.

Figure 2:
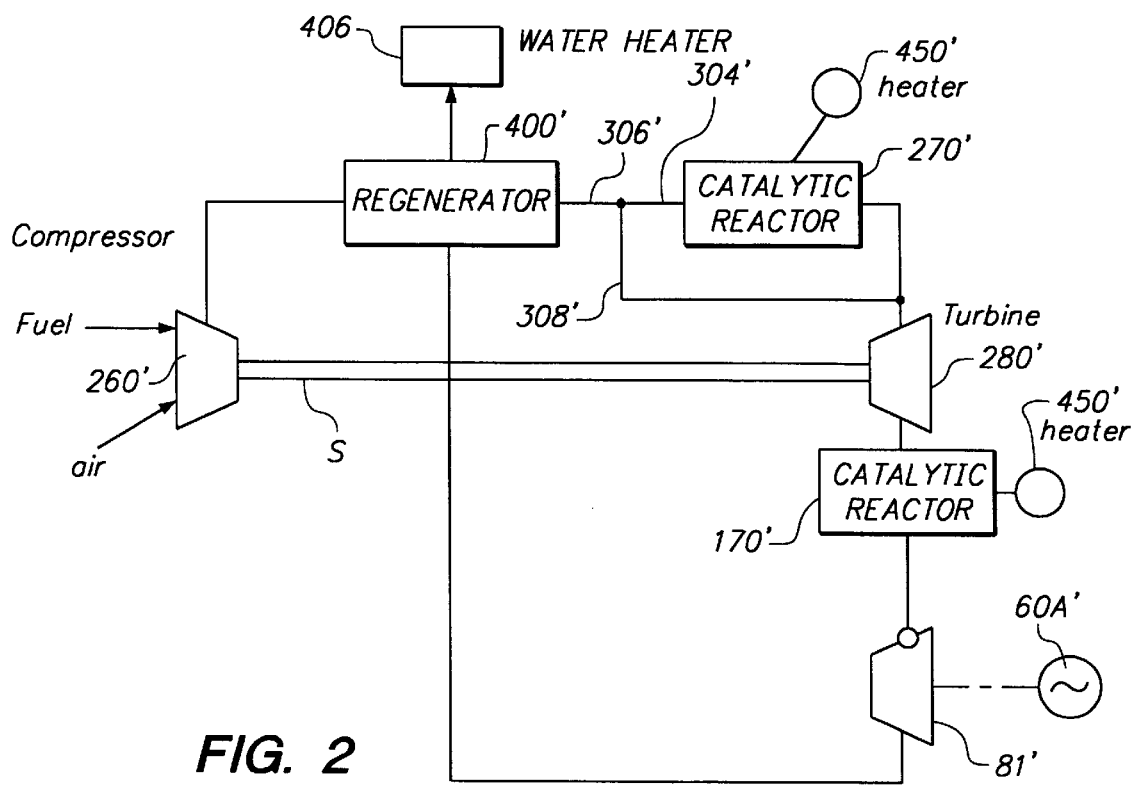
FIG. 2 is a schematic view of a single-spool turbine mechanism utilizing principles of the present invention.

The air/fuel by-pass concept of the present invention could be employed in a single-spool system as shown in FIG. 2. That system employs a portion of the multi-spool system shown in FIG. 1, i.e. a single compressor 260' and turbine 280' mounted on a shaft S. The compressor 260' compresses and mixes air and fuel, and the regenerator 400' heats the compressed air/fuel. Some of the heated compressed air/fuel is fed directly into a first catalytic reactor 270', and some is diverted to the inlet of a turbine 280'. Combusted gas and uncombusted air/fuel are expanded in the turbine 280'. Then, the uncombusted air/fuel from the turbine 280' is combusted in a second catalytic reactor 170', and the exhaust gas therefrom is fed to a power turbine 81' which drives an electrical generator 60A'.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims. For example, instead of connecting the generator 60A to the low pressure turbine 80, it could instead be connected to any of the turbines, or to the separate power turbine 81.

In the claims:

1. A multi-shaft reheat turbine mechanism comprising:

a plurality of shafts, expansion turbines connected respectively to all shafts, and compressors connected respectively to at least two shafts for compressing air and fuel;

means for supplying air and fuel into the compressor side to be compressed thereby;

an intercooler disposed in a line extending between an outlet of one of the compressors and an inlet of another of the compressors for cooling compressed air/fuel traveling between those compressors;

the compressors constituting a compressor side of the mechanism for compressing air/fuel, and the turbines constituting a turbine side of the mechanism for driving the compressors;

at least one electrical generator operably connected to the turbine side to be powered thereby;

a heat exchanger for conducting compressed air/fuel from the compressor side in heat exchange relationship with hot exhaust gas from the turbine side, to heat the compressed air/fuel;

the turbine side further including combustors for combusting compressed air/fuel, each combustor disposed upstream of an associated turbine, and including an outlet for conducting combusted air/fuel to its respective turbine;

a first of the turbines being disposed upstream of a second of the turbines, with an exhaust outlet of the first turbine connected to a second of the combustors, the second combustor being associated with the second turbine; and a conduit arrangement for conducting a first portion of the heated compressed air/fuel to a first of the combustors, the first combustor being associated with the first turbine, and for conducting the exhaust gas from the first combustor, together with a second portion of the heated compressed air/fuel, to the first turbine to be expanded therein.

2. The turbine mechanism according to claim 1 further comprising an additional conduit arrangement communicating with an outlet of the first turbine for conducting a portion of expanded exhaust from the first turbine to the second combustor, and for conducting another portion of expanded exhaust from the first turbine to the second turbine.

3. The turbine mechanism according to claim 2 wherein the turbine side further includes a power turbine connected to a shaft to which no compressor is attached and to which an electrical generator is attached, the power turbine disposed downstream of all turbines mounted on shafts to which compressors are attached.

4. The turbine mechanism according to claim 3, further including an additional combustor arranged upstream of the power turbine.

5. The turbine mechanism according to claim 3 wherein the turbines further include a third turbine mounted to a shaft to which a compressor is attached; a third combustor associated with the third turbine and located between the second and third turbines; another conduit arrangement provided for conducting a portion of expanded exhaust from the second turbine to the third combustor, and another portion of expanded exhaust from the second turbine to the third turbine; the combustor associated with the power turbine being connected to the third turbine for receiving exhaust gas therefrom.

6. The turbine mechanism according to claim 1 wherein the heat exchanger is a regenerator having a core movable through separate paths in which the compressed air/fuel flow, and hot exhaust gas from the turbine side are conducted, respectively.

7. The turbine mechanism according to claim 6 wherein each of the combustors is a catalytic reactor.

8. The turbine mechanism according to claim 1 wherein each of the combustors is a catalytic reactor.

9. The turbine mechanism according to claim 1 wherein the means for introducing air and fuel comprises means for introducing air and fuel directly and separately into a first of the compressors.

10. A turbine mechanism comprising:

a spool comprising a shaft, a compressor connected to the shaft, and a first expansion turbine connected to the shaft:

the compressor comprising a compressor side of the mechanism for compressing air/fuel, and the turbine comprising a turbine-side of the mechanism for driving the compressor;

means for supplying air and fuel to the compressor side to be compressed thereby;

at least one electrical generator operably connected to the turbine side to be powered thereby:

a heat exchanger for conducting compressed air/fuel from the compressor side in heat exchange relationship with hot exhaust gas from the turbine side, to heat the compressed air/fuel;

the turbine side including a first combustor disposed upstream of first turbine, a second combustor disposed downstream of the first turbine, and a second turbine disposed downstream of the second combustor; and a conduit arrangement for conducting a first portion of the heated compressed air to the first combustor, and for conducting products of combustion from the first combustor, together with a second portion of the heated compressed air/fuel, to the first turbine.

11. A method of producing energy, utilizing a multi-shaft reheat turbine mechanism comprising a plurality of shafts, expansion turbines connected respectively to all shafts, and compressors connected respectively to at least two shafts, the compressors constituting a compressor side, and the turbines constituting a turbine side; the method comprising the steps of:

A. delivering air and fuel one of the compressors which emits compressed air/fuel;

B. cooling the compressed air/fuel in an intercooler; thereafter

C. delivering the cooled air/fuel from the intercooler to another of the compressors; thereafter D. passing the cooled air/fuel through a heat exchanger in heat exchanging relationship with exhaust gas from the turbine side of the mechanism subsequent to step C, to produce a heated compressed air/fuel flow; thereafter E. reacting only a portion of the fuel of the flow in a combustor and then delivering the flow, including unreacted fuel, to one of the turbines of the turbine side; thereafter F. reacting expanded exhaust from the one turbine, including unreacted fuel, in another combustor, and then delivering the flow, including expanded exhaust, to another turbine disposed downstream thereof; and G. driving an electrical generator operably connected to the turbine side.

12. The method according to claim 11 wherein step D comprises passing compressed air/fuel through a cold side of a regenerator while conducting the exhaust gas through a hot side thereof, and moving a heat-exchange core through the hot and cold paths.

13. The method according to claim 11 wherein the combustors are catalytic reactors.

14. The method according to claim 11, wherein step E comprises passing the flow through a combustor with a residence time insufficient for reacting all of the fuel in the flow passing therethrough.

15. The method according to claim 11 wherein step E comprises passing the flow through a combustor having an insufficient capacity for reacting all of the fuel passing therethrough.

16. The method according to claim 11 wherein step E comprises passing only some of the flow through a combustor and causing some of the flow to bypass the combustor and be delivered directly to a turbine disposed downstream thereof.

17. The method according to claim 11 wherein step A comprises delivering air and fuel directly and separately into the one compressor.

18. The method according to claim 11 wherein step A comprises delivering all of the air and fuel to the one compressor.

* * * * *